J. F. LANGDON.
BAND CUTTER AND FEEDER.
APPLICATION FILED DEC. 9, 1911.
1,261,562.
Patented Apr. 2, 1918.
3 SHEETS—SHEET 2.
Fig. II.
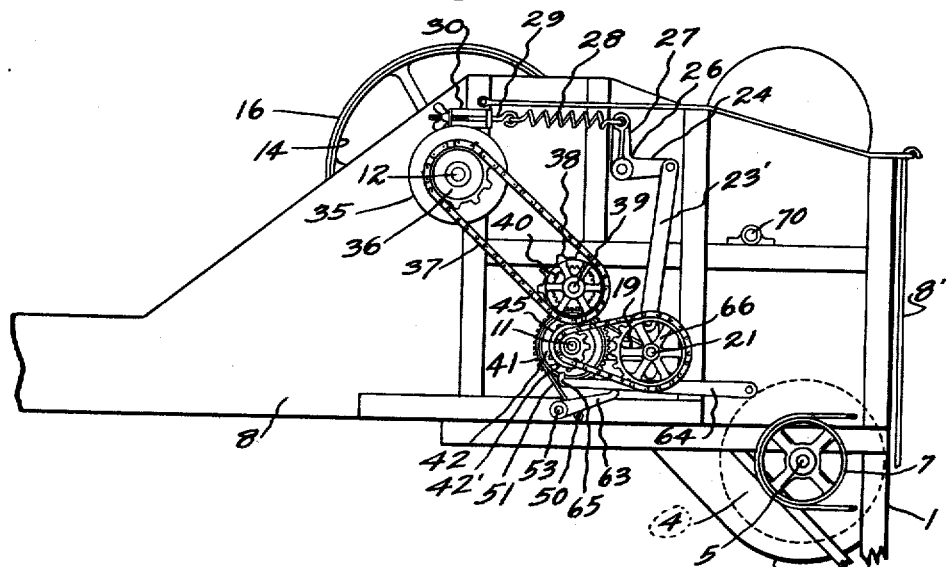
Fig. III.
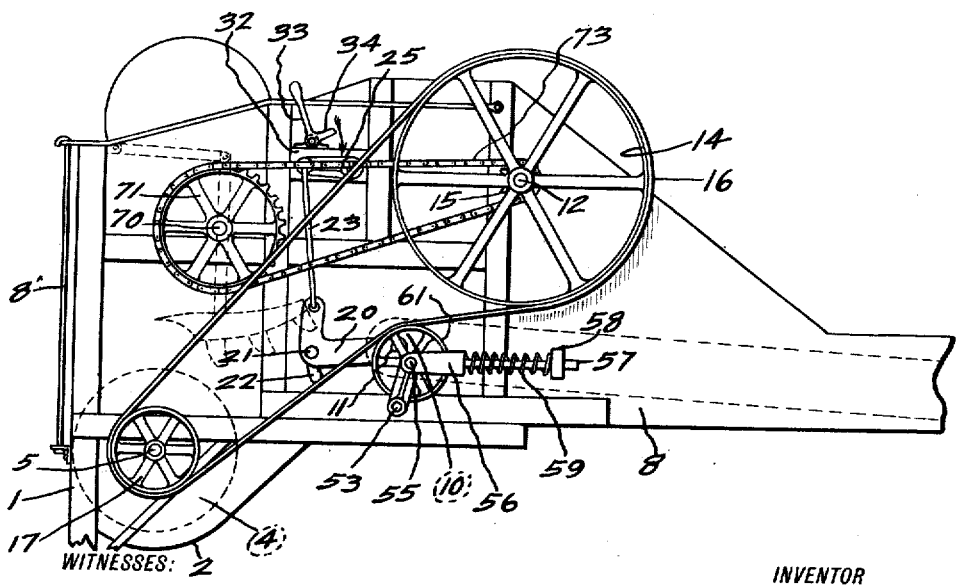
WITNESSES:
Arthur W. Caps.
Myrtle M. Jameson.
INVENTOR
John F. Langdon.
BY
Arthur C. Brown
ATTORNEY J. F. LANGDON.
BAND CUTTER AND FEEDER.
APPLICATION FILED DEC. 9, 1911.
1,261,562.
Patented Apr. 2, 1918.
3 SHEETS—SHEET 3.
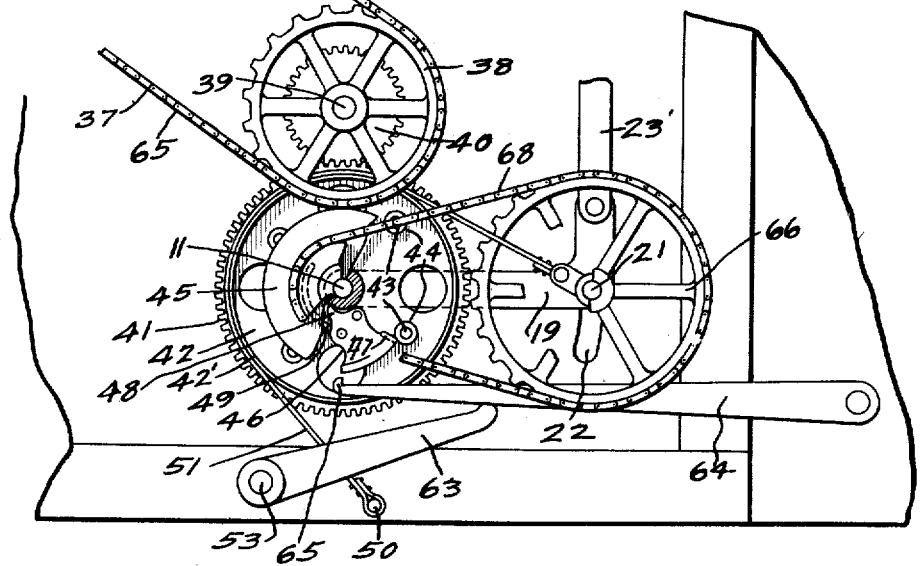
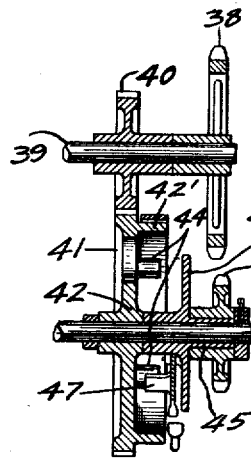
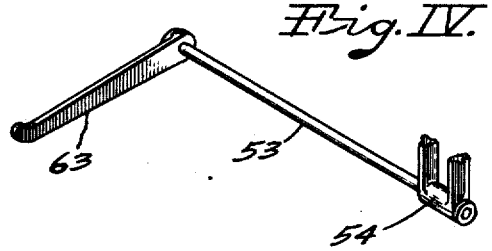
WITNESSES:
INVENTOR
John F. Langdon
BY
ATTORNEY

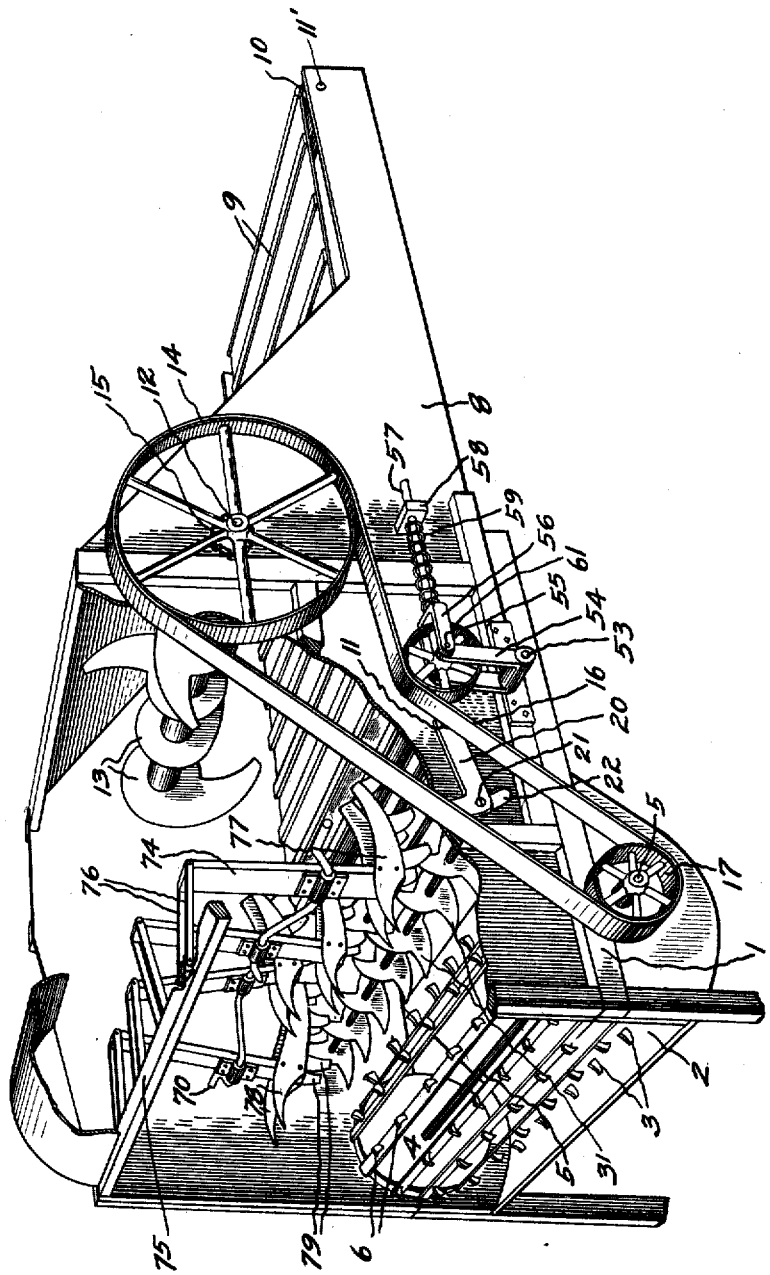

UNITED STATES PATENT OFFICE.

JOHN F. LANGDON, OF KANSAS CITY, KANSAS.

BAND-CUTTER AND FEEDER.

1,261,562.  Specification of Letters Patent.  Patented Apr. 2, 1918.

Application filed December 9, 1911. Serial No. 664,872.

*To all whom it may concern:*

Be it known that I, John F. Langdon, a citizen of the United States, residing at Kansas City, in the county of Wyandotte and State of Kansas, have invented certain new and useful Improvements in Band-Cutters and Feeders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a band cutter and feeder for use in combination with threshing machines, and has for its principal object to provide a device of that character wherein the feeding mechanism is automatically retarded when the threshing mechanism becomes clogged or overcharged, without interrupting the operation of the threshing mechanism.

It is a further object of the invention to provide means for assisting the cylinder teeth to carry material into the concave, and particularly for accomplishing this purpose when the mechanism is overcharged.

In accomplishing these objects, I have provided the improved details of structure hereinafter described and pointed out in the claims, reference being had to the accompanying drawings, wherein:—

Figure I is a perspective view of a feeder and band cutter constructed according to my invention, with part of a threshing machine upon which my apparatus is used; parts of the machine and of the apparatus being broken away for better illustration.

Fig. II is a left hand elevation of the parts shown in Fig. I.

Fig. III is a right hand elevation of same.

Fig. IV is an enlarged detail view of the governor mechanism.

Fig. V is a vertical section through shafts 11 and 39, as shown in Fig. IV.

Fig. VI is a detail view of the governor actuating device.

Referring more in detail to the parts:—

1 designates a part of a threshing machine frame, 2 the concave, having teeth 3, and 4 the cylinder which is fixed on a shaft 5 and has the ordinary threshing teeth 6, the cylinder shaft 5 being revolubly mounted in the frame 1 and provided with a pulley 7 by which it may be driven through belt connection with a suitable motor (not shown).

Supported on the main frame, and secured thereto by rods 8' is a feeder frame 8 containing an endless conveyer belt 9 which runs over rollers 10 on shafts 11—11', journaled in opposite ends of the frame.

Revolubly mounted in the feeder case is a shaft 12 which extends over the inner end of the conveyer and carries band cutting knives 13, one end of the shaft being projected laterally from the case and provided with a pulley 14 and sprocket wheel 15. Shaft 12 is driven from the threshing cylinder shaft by a belt 16, which runs over the pulley 14 and over a pulley 17 on the cylinder shaft.

Pivotally mounted on projecting ends of shaft 11 are bell crank members 19—20, and revolubly mounted in the elbows of said members is a shaft 21, which extends through arcual slots 22 in the feeder case and across the case, close to the inner end of the conveyer. Crank members 19—20 are supported by links 23—23' which are carried on the free ends of arms 24—25, which are pivotally mounted on a shaft extending across the conveyer case, the arm 24 being part of a bell crank 26, the other arm, 27, of which is connected with a spring 28 carried by a turnbuckle 29 on a bracket 30 on the feeder case and adapted to yieldingly retain the retarder shaft in the upper ends of the arcual slots 22.

Shaft 21 carries a number of retarder blades 31 which are adapted to receive material directly from the conveyer, and over which the material must pass to reach the threshing cylinder.

Pivotally mounted on a block 32 on the feeder frame is a lever 33, having a head 34 adapted for engagement with the arm 25 to force the arm downwardly to lower the retarder and hold same in lowered position, so that the conveyer may be positively stopped by manual manipulation of the lever 33 although such lever and its connecting parts do not interfere with the automatic adjustment of the retarder under normal working conditions.

Mounted on the band cutter shaft 12 is a friction drive wheel 35 of the speed controlled type, preferably of the construction illustrated in my copending application filed April 17, 1911, Serial Number 621,499; the driven member of which is adapted to slip when overloaded.

Wheel 35 has a sprocket wheel 36 connected by belt 37 with a sprocket wheel 38 which is revolubly mounted on a stub axle 39 on the feeder case.

Revolubly mounted on the axle 39 and rigidly connected with the sprocket wheel 38 (in a manner not shown) is a gear wheel 40 which meshes with the gear 41 on a hub 42 that is revolubly mounted on the conveyer shaft 11 and has a laterally turned edge flange 42'. On the outer face of wheel 42 are a number of posts 43, carrying rollers 44.

Fixed on shaft 11 is a disk 45. Pivotally mounted on disk 45 is a dog 46, having an ear 47 extending inwardly into position for engagement with the rollers 44, and having a tongue 48 adapted for engagement with the hub of the disk, so that when the dog is engaged by one of the rollers the tongue will bind against the hub and a driving connection formed between the fixed disk and loose gear. 49 designates a spring which normally yieldingly retains the dog in its connecting position.

Secured, at one end, on a post 50 on the feeder casing, is a strap 51, which is passed over the flange 42' and is connected at its opposite end with the retarder shaft 21, so that when the shaft is lowered the strap will act on the brake flange to stop the revolution of the feeder by retarding the travel of the friction drive wheel 35 on the cutter shaft 12.

Revolubly mounted in the sides of the feeder case and extending therethrough, is a shaft 53, the ends of which project laterally from the sides of the case.

Fixed on one of the projecting ends of shaft 53 is a yoke 54, having an axle 55 mounted in the ends of its arms, and projecting laterally therefrom.

Pivotally mounted on the projecting ends of axle 55 is a yoke 56, having a shank 57 slidably projected through a bracket 58 on the feeder case. Surrounding the shank 57 and bearing against the bracket 58 and yoke 56 is a spring 59 which yieldingly tensions the yokes 56 and 54 toward the rear of the feeder. Revolubly mounted on axle 55 between the arms of yokes 54 and 56 is a band wheel 61 which engages the under or tight side of belt 16 and serves as a belt tightener.

Fixed on the end of shaft 53 opposite the belt tightener is a pawl 63 which is adapted for engagement with the under edge of an arm 64 that is pivotally mounted on the feeder case and has a tooth 65 on its free end adapted for locking engagement with the dog 46 when the arm is lifted by the pawl 63, to hold said dog so that the rollers on the wheel 42 may pass thereover to enable the wheel to revolve without revolving the conveyer shaft.

Fixed on the hub 45', of disk 45, is a sprocket wheel 65, and running over said wheel and over a sprocket wheel 66 fixed on the retarder shaft 21, is a chain belt 68 which revolves the retarder shaft when the disk revolves, but leaves the retarder shaft idle when the disk is disconnected from its driving mechanism as described.

Journaled in the feeder frame and extending above and slightly forward of the cylinder position is a crank shaft 70, having a sprocket wheel 71, driven from a sprocket wheel 15 on the cutter shaft by a belt 73. Pivotally mounted on the cranked portions of shaft 70 are beams 74, the upper ends of which are pivotally connected with a cross bar 75 by links 76, so that they will have both vertical and forward and back movement.

Fixed to the lower ends of the beams 74 are bars 77, the rear portion, 78, of which extend over the threshing cylinder and the forward portion of which extend over the rear end of the conveyer and carry blades 79.

In using the apparatus, presuming the conveyer frame to be mounted on the threshing frame and the parts to be assembled as described, the threshing cylinder, band cutting knives, and crank operated raking knives will operate constantly when the motor is active, the cylinder and band cutter knives performing their usual functions and the raking knives combing material from the conveyer over the retarder and onto the threshing cylinder, incidentally cutting any bands that may have passed the primary knives, and breaking up the mass of material so that it may be better treated by the threshing parts. Owing to the elliptical movement of the rakes, their forward ends will rise as they approach the conveyer on their forward movement and work downwardly and rearwardly on the return travel, so that the material is compressed as it passes over the retarder and approaches the cylinder. After the material has been delivered to the cylinder and the rakers start back to the conveyer, the upward movement of the forward ends of the knives is reversed in the rear ends thereof, so that such rear ends press the material onto the threshing cylinder and enable the cylinder teeth to get a better grip on the material and forward it into the concave. The pressure of the walking knives is especially advantageous when the cylinder teeth are dull or when damp or matted grain is being treated.

Under normal conditions the conveyer shaft 11 and retarder shaft 21 will be revolved with the threshing cylinder and knives, but should the machine be overcharged or a mass of damp or matted grain clog the cylinder, the retarder will be forced downwardly against the tension of the spring 28, thereby tightening the band 51 on the flange 42' and hold the wheel 42 so that the friction drive wheel 35 will slip, thus stopping the conveyer and retarder and allowing bars 77 to clear away the clogged mass. While the retarder remains depressed the retarder shaft and conveyer will be stopped, so that the supply of grain will be discontinued, the band cutter and raking knives continuing to operate, however, until the mass of material has been combed off of the retarder into the cylinder.

When the overcharge or clogging has been relieved, the retarder will rise and the conveyer and retarder resume their normal operation.

Should the conveyer itself be overcharged so that too great a mass of material is fed to the band cutter, the over-burden on the cutters will be transferred to the tight side of the belt 16, which will straighten under the strain and rock the belt tightener against the tension of its spring. When the tightener shaft 53 is rocked it lifts the pawl 63, which in turn lifts the arm 64 so that the tooth 65 holds the dog 46 while the stops on wheel 42 ride thereover and the wheel revolves idly and the conveyer and retarder are stopped as described with reference to the band brake.

A mass of material caught in the retarder and cylinder teeth will be jerked downwardly by the faster moving cylinder teeth and lower the retarder, thereby actuating the governor to stop the conveyer and interrupt the feed until the parts are cleared.

The retarder may be set so close to the cylinder that an over charge on the cylinder will depress the retarder, so that the retarder teeth, when lowered will close the passage between same and the cylinder, thereby preventing the passage of any material into the concave until the cylinder teeth have chopped or shredded the material sufficiently to free the retarder and permit it to rise; it being apparent that while the retarder is depressed and the cylinder is chopping the mass, the feed from the conveyer will be interrupted through the friction drive mechanism.

It is apparent that as soon as the over-burden on the belt 16 is relieved, the belt tightener will be returned to its normal position and the parts act as before.

Having thus described my invention, what I claim as new therein and desire to secure by Letters Patent is:

1. The combination with a threshing cylinder, of a conveyer, a retarder interposed between the conveyer and cylinder, a reciprocatory rake rockably mounted above the retarder and cylinder, and means disposed over and between the cylinder and retarder for actuating the rake to effect downward movement thereof in the direction of the retarder upon rearward travel of the rake and downward movement thereof in the direction of the cylinder and in the direction of travel of the cylinder upon forward travel of the rake, to alternately press material against the retarder and cylinder.

2. The combination with a conveyer, of a retarder, a cylinder, a rake, longitudinally and pivotally movable means for supporting the rake intermediate its ends, mechanism disposed over and between the retarder and cylinder for actuating said supporting means to effect movement of the forward part of the rake downwardly toward the retarder upon rearward movement of the rake and movement of the rear part downwardly toward the cylinder upon the forward travel of the rake, for the purpose set forth.

3. The combination with a conveyer, of a threshing cylinder, an adjustable retarder, a band cutter, means for raking material from the retarder and pressing the same against the threshing cylinder, means for actuating the band cutter, the raking means and the threshing cylinder, means including a clutch for actuating the conveyer and retarder, whereby pressure on the retarder will break the clutch to interrupt travel of the conveyer and retarder, a link yieldingly supporting the retarder and a hand lever for actuating said link.

4. The combination with a conveyer, of a band cutter mechanism for driving the conveyer, comprising a clutch, a band cutter shaft, means for driving said shaft, comprising a belt, a roller mounting adjacent to said belt and adapted for positive actuation thereby, a roller carried in said mounting, a spring for yieldingly tensioning said mounting toward the belt, and means operable by said mounting for actuating said clutch when said belt is tensioned.

5. The combination with a conveyer, of a band cutter mechanism for driving the conveyer, comprising a clutch, a band cutter shaft, means for driving said shaft comprising a belt, a pivotally mounted arm adapted for actuating said clutch, a shaft having a member adapted for engaging said arm, a roller mounting on said shaft, a roller on said mounting engaged and adapted for positive actuation by said belt, a stationary block, a shank on said mounting adapted for sliding travel in said block, and a spring on said shank between the mounting and block, for the purpose set forth.

6. The combination with a conveyer, having a drive shaft, fixed and loose members on said shaft, one of said members having fixed clutch devices and the other having a pivoted device adapted for normal driving engagement with the fixed devices, a pivoted arm having a tooth adapted for engaging said pivoted device to break said driving engagement, a band cutter having a shaft, a belt for driving said shaft, a revoluble shaft having an arm adapted for rocking said pivoted arm, and a spring controlled member fastened on said shaft and engaging said belt and adapted for positive actuation by the belt.

7. The combination with a conveyer, of clutch mechanism for driving the conveyer, a band cutter and a threshing cylinder having driving shafts, band wheels on said shafts, a belt run over said band wheels, a rock shaft, means on the rock shaft for controlling said clutch, and a contact member mounted on said rock shaft and yieldingly tensioned against the tight side of said belt, for the purpose set forth.

In testimony whereof I affix my signature in presence of two witnesses.

JOHN F. LANGDON.

Witnesses:
M. M. JACKSON,
ARTHUR U. CAPS.